United States Patent
Zas Couce et al.

(10) Patent No.: US 8,655,349 B2
(45) Date of Patent: Feb. 18, 2014

(54) RADIO ACCESS TECHNOLOGY CONFIGURATION IN FEMTO-CELL BASE STATIONS

(75) Inventors: Luis Gabriel Zas Couce, Madrid (ES); Jose Angel Perez De La Rosa, Madrid (ES); Francisco Javier Dominguez Romero, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 177 days.

(21) Appl. No.: 13/149,805

(22) Filed: May 31, 2011

(65) Prior Publication Data

US 2012/0115462 A1    May 10, 2012

(30) Foreign Application Priority Data

May 31, 2010  (ES) .................. P201030831

(51) Int. Cl.
*H04W 24/00* (2009.01)
(52) U.S. Cl.
USPC .......... 455/424; 455/444; 455/447; 455/448; 455/450; 455/561
(58) Field of Classification Search
None
See application file for complete search history.

(56) References Cited

U.S. PATENT DOCUMENTS

| | | | |
|---|---|---|---|
| 2007/0097939 A1 | 5/2007 | Nylander et al. | |
| 2009/0098871 A1* | 4/2009 | Gogic | 455/435.1 |
| 2009/0149194 A1* | 6/2009 | Howard | 455/456.1 |
| 2009/0213730 A1* | 8/2009 | Zeng et al. | 370/217 |
| 2009/0253421 A1 | 10/2009 | Camp, Jr. et al. | |
| 2010/0120438 A1 | 5/2010 | Kone | |
| 2010/0273474 A1* | 10/2010 | Carmon et al. | 455/424 |
| 2011/0030035 A1* | 2/2011 | Wu | 726/4 |
| 2011/0086614 A1* | 4/2011 | Brisebois et al. | 455/411 |

FOREIGN PATENT DOCUMENTS

EP    2112846 A1    10/2009

OTHER PUBLICATIONS

Spanish Search Report for ES 201030831 dated May 31, 2010.
U.S. Appl. No. 13/149,799, filed May 31, 2011, Zas Couce et al.

* cited by examiner

*Primary Examiner* — Suhail Khan
(74) *Attorney, Agent, or Firm* — Workman Nydegger

(57) ABSTRACT

A method and apparatus for operating a femto-cell base station are disclosed. The femto-cell base station is configured to provide coverage to a User Equipment by connecting it to a core telecommunications network using a first frequency belonging to a first radio access technology. The method includes detecting that a fixed network connection of a femto-cell base station is not operative, and, in response to such failure, scanning frequencies in a second radio access technology available to a wireless network interface of the femto-cell base station, said second radio access technology being different than the first radio access technology. If there is any frequency available in said second radio access technology, said frequency in said second radio access technology is established as the operational frequency of a cellular wireless network connection established by the wireless network interface.

11 Claims, 2 Drawing Sheets

RADIO ACCESS TECHNOLOGY CONFIGURATION IN FEMTO-CELL BASE STATIONS

CROSS-REFERENCE TO RELATED APPLICATIONS

This Application claims priority to and the benefit of Spanish Patent Application No. ES P201030831, filed May 31, 2010, which is incorporated herein by reference in its entirety.

FIELD

Embodiments of the present invention are directed to the field of mobile communications, and more specifically to a method for modifying the radio access technology configuration of a femto-cell based station, such as a 3G/LTE femto-cell base station or Home (e)Node B (HNB).

BACKGROUND

In order to provide enhanced indoor cellular telecommunications network coverage at a customer's home or office, it is known (see FIG. 1) to provide the customer with a femto-cell base station 10, also known as Home Node B (HNB) or simply as a femto-cell. The Home Node B 10 typically has an xDSL router and modem, thereby facilitating the provision of different native cellular telecommunications services (both voice and data services) by using an existing customer xDSL line 11 to connect the Home Node B 10 to the core network 30 of the cellular telecommunications network 40. The Home Node B 10 and xDSL router and modem device may be separate devices or a single hybrid device (as in FIG. 1). The femto-cell supports both 3G and LTE technologies just through a change in the software configuration.

A further development of the router device combines the xDSL router and modem device with a cellular telecommunications modem (e.g. an HSPA/LTE modem or USB dongle); the cellular telecommunications modem is configured to provide a wireless connection with the cellular telecommunications network 40 in case the xDSL connection fails, or also at the time of first using the device (if the xDSL line has not been provisioned and is not working yet).

Problems arise when both the Home Node B 10 and the cellular telecommunications modem use radio frequencies associated with the same cellular telecommunications network. In particular, problems may occur with the available carriers: the radio access technology and the frequency allocated to the HNB 10 (for indoor communications) can be the same as the "macro layer" technology and frequency used by the cellular telecommunications modem. Therefore, if there is a failure in the DSL line (or there is no operational xDSL line for some other reason) and the HSPA/LTE backup starts working, there may be interference thereby preventing the femto-cell base station or Home Node B and the macro network connection from working simultaneously.

Currently, such interference (which may occur whenever the DSL link is not available for some reason and the cellular telecommunications modem has to be activated to provide backup connection), may only be avoided by automatically disabling the Home Node B.

BRIEF SUMMARY

Embodiments of the present invention are directed to a method and an apparatus, such as a connection manager, for operating a femto-cell base station.

An example method or apparatus may provide a communication service environment at the customer's home (or office) such that when a wireless connection from a home node B device to a macro-cell of a cellular communications network is required instead of (or in addition to) a xDSL connection, that macrocell connection may operate substantially simultaneously, without interference from the femto-cell of a home gateway device.

In a first example embodiment, a femto-cell base station is configured to provide coverage to a User Equipment by connecting it to a core telecommunications network using a first frequency belonging to a first radio access technology, the femto-cell base station having a fixed network interface for establishing a fixed network connection to said core telecommunications network, and a wireless network interface for establishing a cellular wireless network connection to said core telecommunications network. A method for operating the femto-cell base station includes detecting that said fixed network connection is not operative. The method further includes, in response to such failure: scanning frequencies to find a second radio access technology available to the wireless network interface, said second radio access technology being different than the first radio access technology; if there is any frequency available in said second radio access technology compatible with the first radio access technology used, establishing a data connection in said second radio access technology as the cellular wireless network connection; and if there is no frequency available in said second radio access technology, disconnecting the femto-cell base station from the User Equipment and assigning the first frequency in the first radio access technology to the cellular wireless network connection.

In a second example embodiment, a connection manager for operating the femto-cell base station includes a detector configured to detect that said fixed network connection is not operative; a scanner configured to scan frequencies to find a second radio access technology available to the wireless network interface, said second radio access technology being different than the first radio access technology; and a processor. The processor is configured to establish a frequency in said second radio access technology as the operational frequency of the cellular wireless network connection, if there is any frequency available in said second radio access technology; and disconnect the femto-cell base station from the User Equipment and assign the first frequency in the first radio access technology to the cellular wireless network connection, if there is no frequency available in said second radio access technology, whereby the connection manager ensures that the femto-cell base station and the wireless network interface each operate using different radio access technologies.

DETAILED DESCRIPTION OF EXAMPLE EMBODIMENTS

Reference will now be made in detail to some example embodiments of the present invention.

Figure 1:
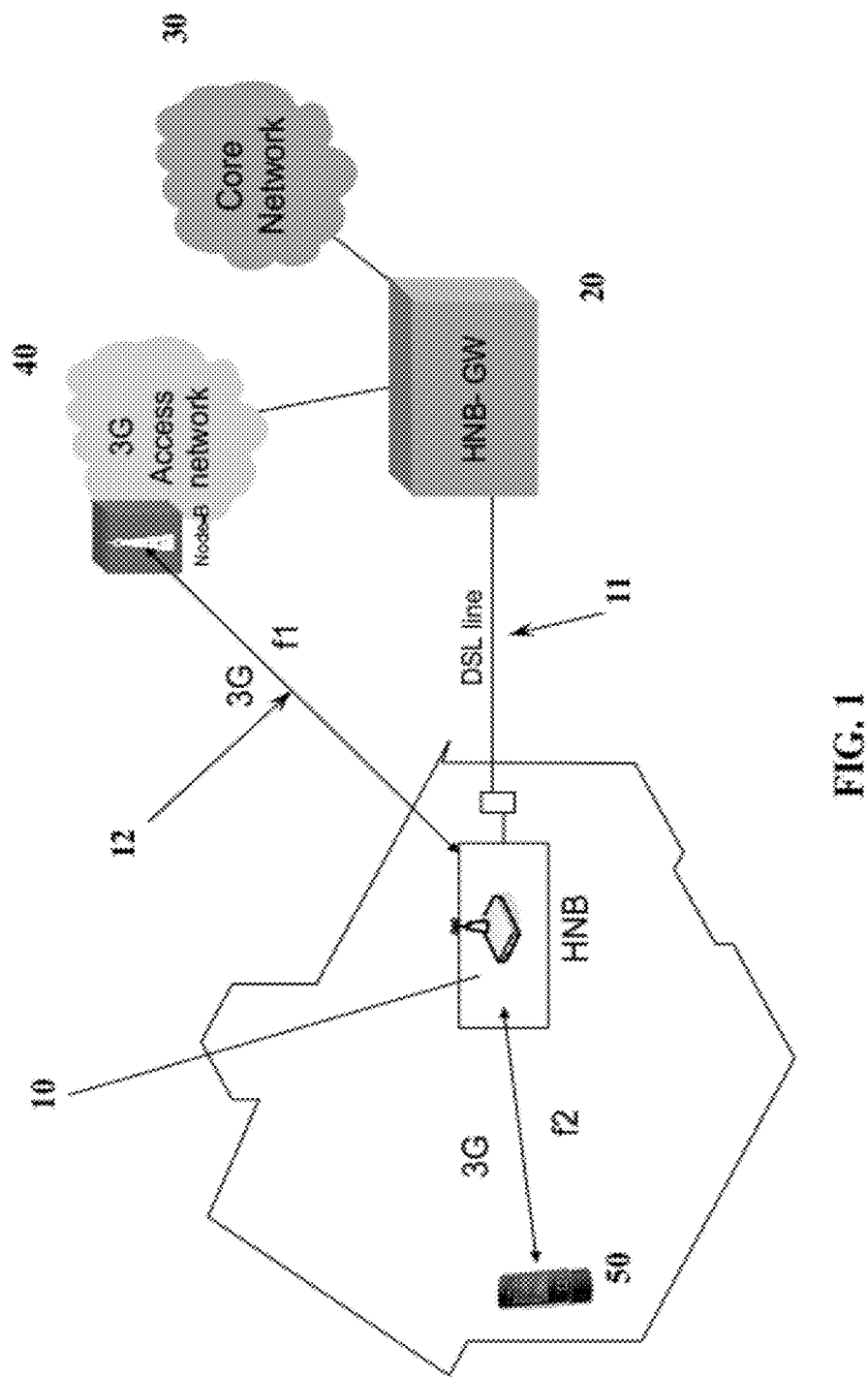
FIG. 1 schematically shows a Home Node B connection at a customer's home (or office).

As it has been indicated above (and shown in FIG. 1), it is possible to provide a Home eNode B 10 with a DSL modem combined with an HSPA/LTE modem, for example, an integrated modem component or a detachable HSPA/LTE USB dongle. This Home eNode B 10 is provided to improve the customer's 3G or LTE coverage, and it can be integral with the HSPA/LTE dongle and DSL modem, or it can also be a separate device. In the illustrated example the operational radio access technology used by this Home eNode B to provide coverage to a user equipment 50 is denoted RAT2.

This Home eNode B is also configured to detect any DSL link unavailability. The DSL link may be unavailable for a variety of different reasons, for instance:

the DSL line may not yet have been set up for the customer;

the DSL may fail during the lifecycle of the connection (as might happen if the relevant cable were physically cut or a DSLAM component were to fail in the exchange).

Figure 2:
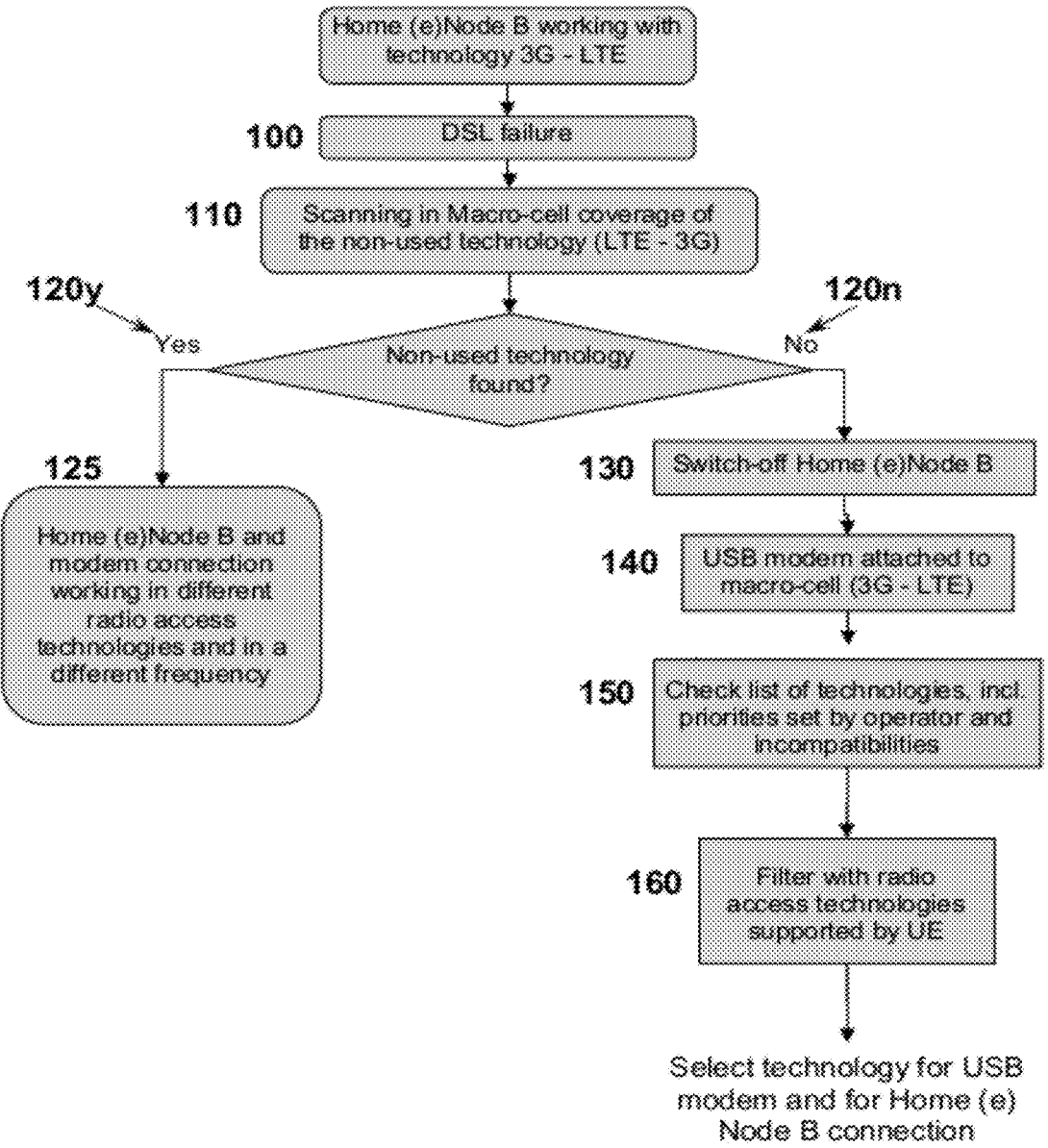
FIG. 2 schematically shows how the selection of the operating technology is carried out.

As shown in FIG. 2, once it has been determined that a DSL failure has occurred (step 100), a frequency scanning of the available radio access technologies in all the supported bands of the user equipment UE is carried out in order to see if there is an alternative radio access technology to the one used by the Home eNode B (step 110), so as to avoid interferences. If an alternative radio access technology suitable to be used is found (120y), then the Home eNode B and the modem connection to the network use different radio access technologies and in different frequencies (step 125), for instance, the Home eNode B uses 3G (RAT1=3G), and the modem connection to the network uses LTE (RAT2=LTE), or vice versa. In fact, it is expected that LTE and UMTS will always operate at different frequencies: LTE will typically use 800, 1800 and 2600 while UMTS will typically use 900 or 2100.

If no alternative radio access technology is found (step 120n), then the Home Node B has to be switched-off (step 130), and then the USB modem connects to the macro-cell with the same radio access technology previously used by the Home Node B (step 140).

In this case, the Home Node B 10 decides which radio access technology to use by itself from a list of radio access technologies (and associated frequencies and bandwidths) that has been stored in the Home Node B during configuration setup (step 150), or tries again to establish a communication via a Home Node B gateway 20 to obtain the list of radio access technologies (and associated frequencies and bandwidths). This list of radio access technologies can be in the HNB-GW 20, in the Home Node B Management System (HMS in the 3GPP standards which is the system in charge of the operation and maintenance of the Home Node B and the Home Node B Gateway) or in any other network equipment.

It should be noted that a Home Node B Gateway, HNB-GW, is not a mere gateway; it has the purpose of being a concentrator of Home Node B connections. One Home Node B serves only one cell. Further details of the technical standardised Home Node B can be found in the 3GPP standard TS 25.467 "UTRAN architecture for 3G Home Node B (HNB)".

The Home Node B can operate in either 3G or LTE radio access technology and at some or all of the operating frequencies of those technologies. Both functions are standardised. The LTE architecture can be found in 3GPP TS 36.300. Every technology is different with different channels and different procedures, but both can be implemented through the same Power Amplifier and also in the same baseband unit, just by applying a different Software configuration. The Home eNode B for LTE HeNB has a different logical interface towards the Core Network, which is 51. There is also a HeNB gateway similar to the HNB gateway but with different functions.

The table below illustrates such a list of radio access technologies (and associated frequencies and bandwidths). It shows the different radio access technologies to be used, and in this case carries information regarding priorities set by the operator in case there is more than one possibility. Also, if different technologies are available, incompatibilities between different technologies in near bands can also be taken into account "by policy" when choosing the radio access technology, as shown in the following table:

|           | LTE 800      | LTE 900      | LTE 1800   | LTE 2600     |
|-----------|--------------|--------------|------------|--------------|
| UMTS 900  | Not possible | Not possible | Priority 2 | Priority 3   |
| UMTS 2100 | Priority 1   | Priority 2   | Priority 4 | Priority 3   |
| UMTS 2600 | Priority 4   | Priority 4   | Priority 4 | Not possible |

Naturally, the radio access technology RAT1 chosen needs to be supported by the user equipment 50. In fact, The Home Node B 10 filters the list of radio access technologies available against the information it has regarding the capabilities of the User Equipment (step 160), using for example the UE radio capabilities (reported in the RRC messages, see TS 25.331), and identifies those entries in that list of radio access technologies and bands which match the technologies and bands determined to be supported by the user equipment UE.

Then, the working radio access technology which is most suitable for the Home Node B to provide coverage to the UE is chosen, RAT2.

Once the backup of the HSPA/LTE modem is no longer necessary because the DSL line is operative, the HSPA/LTE modem is deactivated and the radio access technology allocation reverts to the initial radio access technology used.

In certain implementations the Home Node B may scan—periodically, at suitable intervals or triggered by some mechanism (e.g. high interference in the current technology used)—in order to check whether a better radio access technology in terms of interference can be used. An interference threshold is defined for a radio access technology to be considered good enough to be used.

As will be understood by the reader, the method of the present invention applies equally to other cellular telecommunications technologies and in particular to GSM. Whatever Radio Access Technology is used (LTE, GSM or 3G), the invention provides a method for modifying the radio access technology used of the Home (e)Node B, and indeed the bandwidth used: in LTE the bandwidth may vary and it will typically be a bandwidth selected from 1.4, 3, 5, 10 and/or 20 MHz depending on the availability.

The invention is obviously not limited to the specific embodiments described herein, but also encompasses any variations that may be considered by any person skilled in the art (for example, as regards the choice of components, configuration, etc.), within the general scope of the invention as defined in the appended claims.

The invention claimed is:

1. A method for operating a femto-cell base station, the femto-cell base station being configured to provide coverage to a User Equipment by connecting the User Equipment to a core telecommunications network using a first frequency belonging to a first radio access technology, the femto-cell base station having a fixed network interface for establishing a fixed network connection to said core telecommunications network, and a wireless network interface for establishing a cellular wireless network connection to said core telecommunications network, the method comprising the steps of:

detecting that said fixed network connection is not operative, and, in response to such failure:

scanning frequencies to find a second radio access technology available to the wireless network interface, said second radio access technology being different than the first radio access technology;

if there is any frequency available in said second radio access technology suitable to be used, establishing a data connection in said second radio access technology as the cellular wireless network connection; and if there is no frequency available in said second radio access technology, disconnecting the femto-cell base station from the User Equipment and assigning the first frequency in the first radio access technology to the cellular wireless network connection.

2. The method of claim 1, further comprising the step of: trying to reconnect the femto-cell base station to the User Equipment by:

scanning frequencies, radio access technologies and associated bandwidths available to form a list of available frequencies/radio access technologies;

determining if any of the frequencies/radio access technologies in said list is supported by the User Equipment to which the femto-cell base station is trying to provide coverage; and if at least one frequency/radial access technology is supported by the User Equipment, establishing said at least one frequency/radio access technology as the cellular wireless network connection of the femto-cell base station.

3. The method of claim 2, wherein said frequency/radio access technology is selected on the basis that the selected frequency/radio access technology is most separated from the first frequency in the radio-frequency spectrum.

4. The method of claim 2, wherein said frequency/radio access technology is selected on the basis that the interference measured in said frequency/radio access technology with respect to the first frequency is below a pre-established threshold.

5. The method of claim 2, wherein said frequency/radio access technology is selected on the basis that isolation between the frequency/radio access technology and the first frequency is a highest possible.

6. The method of claim 2, wherein said frequency/radio access technology is selected on the basis that it fulfills a predefined criterion in terms of interference quality, and it is preferred by a telecommunications network operator in terms of traffic usage.

7. The method of claim 2, wherein said frequency/radio access technology is selected on the basis of priorities configured by a telecommunications network operator.

8. The method of claim 1, wherein the wireless network interface is a cellular modem module suitable for connecting at least one electronic device to a cellular telecommunications network.

9. The method of claim 1, wherein the femto-cell base station is configured to support at least two of the following three technologies: GSM, UMTS, LTE.

10. A connection manager for operating a femto-cell base station, the femto-cell base station being configured to provide coverage to a User Equipment by connecting the User Equipment to a core telecommunications network using a first frequency belonging to a first radio access technology, the femto-cell base station having a fixed network interface for establishing a fixed network connection to said core telecommunications network, and a wireless network interface for establishing a cellular wireless network connection to said core telecommunications network, the connection manager comprising:

a detector configured to detect that said fixed network connection is not operative;

a scanner configured to scan frequencies to find a second radio access technology available to the wireless network interface, said second radio access technology being different than the first radio access technology; and a processor configured to:

establish a frequency in said second radio access technology as an operational frequency of the cellular wireless network connection, if there is any frequency available in said second radio access technology; and disconnect the femto-cell base station from the User Equipment and assign the first frequency in the first radio access technology to the cellular wireless network connection, if there is no frequency available in said second radio access technology, whereby the connection manager ensures that the femto-cell base station interface with the User Equipment and the wireless network interface each operate using different radio access technologies.

11. The connection manager of claim 10, wherein the femto-cell base station is configured to support at least two of the following three technologies: GSM, UMTS, LTE.

* * * * *